(No Model.)   2 Sheets—Sheet 1.
J. C. FARMER.
APPARATUS FOR CUTTING WEEDS AND GRASS UNDER WATER.
No. 592,985. Patented Nov. 2, 1897.
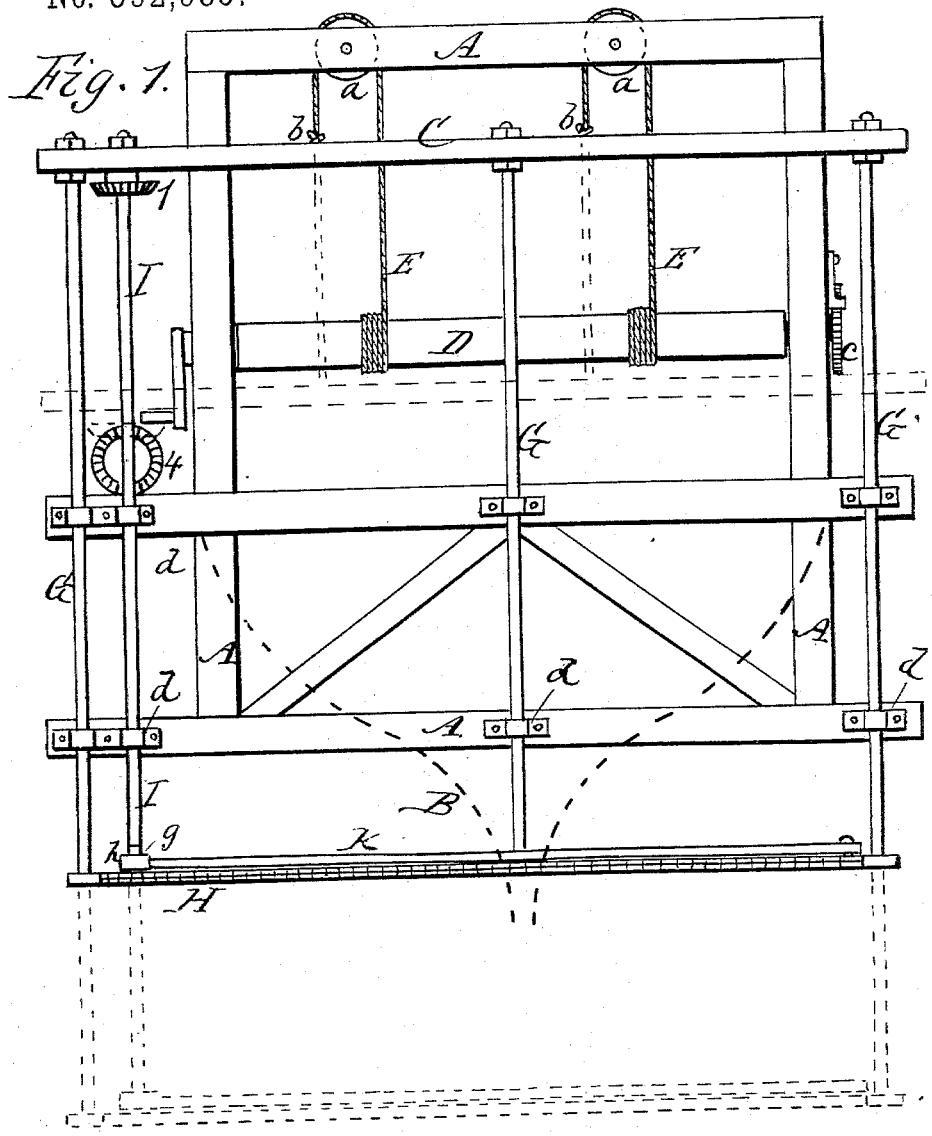
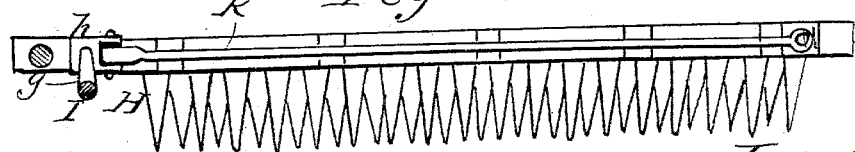
Witnesses.
Chas. R. Osgood
Geo. B. Selden
Inventor.
Joseph C. Farmer,
by R. F. Osgood,
Atty.

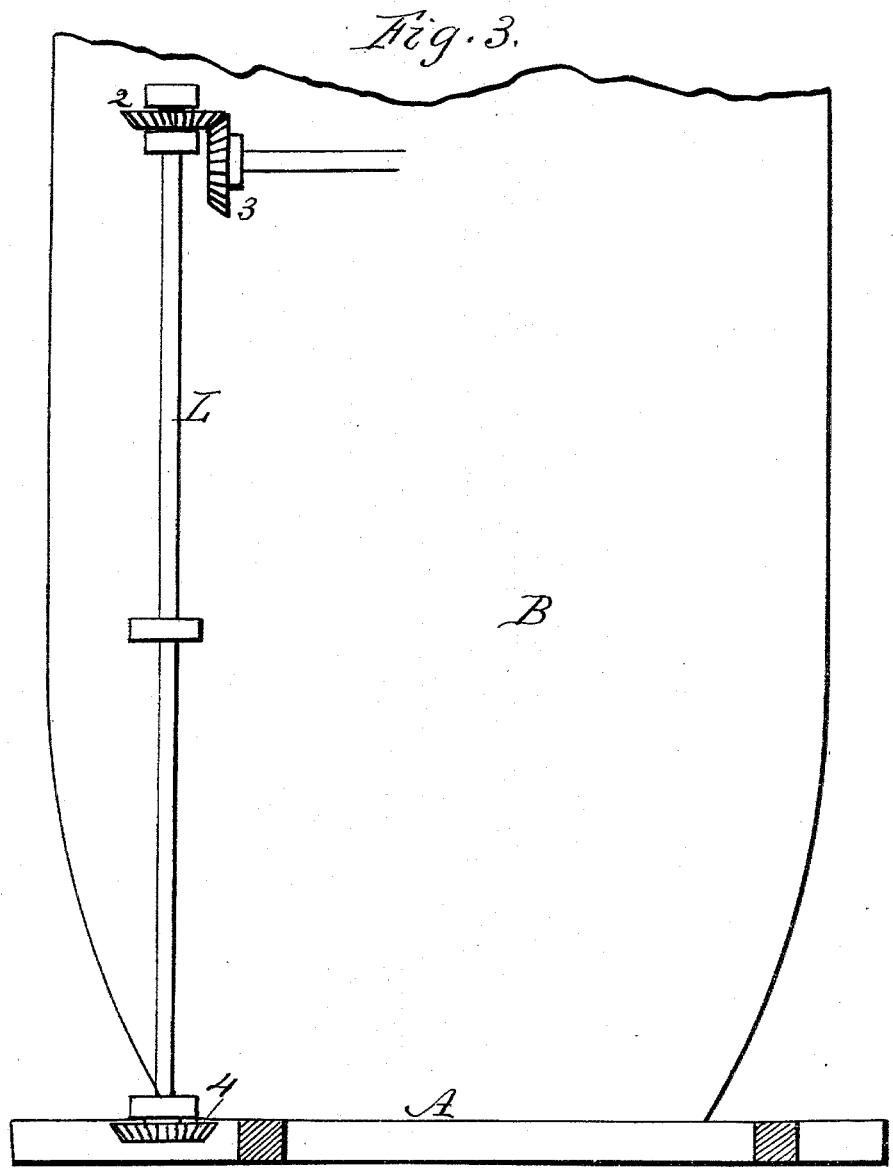

UNITED STATES PATENT OFFICE.

JOSEPH C. FARMER, OF ROCHESTER, NEW YORK.

APPARATUS FOR CUTTING WEEDS AND GRASS UNDER WATER.

SPECIFICATION forming part of Letters Patent No. 592,985, dated November 2, 1897.

Application filed September 10, 1896. Serial No. 605,446. (No model.)

*To all whom it may concern:*

Be it known that I, JOSEPH C. FARMER, of Rochester, in the county of Monroe and State of New York, have invented a certain new and useful Improvement in Apparatus for Cutting Weeds and Grasses Under Water; and I do hereby declare that the following is a full, clear, and exact description of the same, reference being had to the drawings accompanying this application.

My improvement relates to an apparatus attached to a boat for cutting weeds and grasses under water, and is particularly designed for cutting what is known as "eel-grass" in canals, a long and thick grass which grows over a large portion of the bottoms of canals and is a serious impediment to the passage of boats.

The invention consists in the combination and arrangement of parts hereinafter described and claimed.

In the drawings, Figure 1 is a front elevation of the apparatus attached to the bow of a boat. Fig. 2 is a plan of the cutters. Fig. 3 is a plan view of a portion of the boat.

A indicates a stiff vertical frame, of square or rectangular form, attached to the bow of a boat B, said frame serving as the attachment for the operating parts.

C is a cross-bar extending crosswise of the frame and outside of it.

D is a windlass mounted in the frame, and E E are two cords or cables winding on the same, their upper ends extending upward around pulley $a$ $a$, thence downward, and being attached at $b$ $b$ to the cross-bar C. By this means the cross-bar C is raised and lowered. A ratchet and pawl $c$ is used to hold the windlass.

G G G are vertical rods, two on the sides and one in the middle, fixedly attached at the top to the ends of the cross-bar C, said rods extending below the frame and their lower ends being attached to and supporting the cutter H. The rods slide freely through boxes or bearings $d$ $d$, attached to the frame. The cutter consists of a knife-bar and knives reciprocating forward and back over the stationary bar, but having no slotted guides, such as are used in harvesters.

I is a vertical shaft on one side, also attached to the cross-bar C and movable up and down with it, but having free rotary motion. At its upper end it has a bevel-gear 1, and at its lower end a crank $g$. This crank engages with a box $h$ at one end of a pitman K, the opposite end of which is pivoted to the farther end of the knife-bar. By this means proper reciprocating motion is given to the knives.

L, Fig. 3, is the driving-shaft, resting in suitable bearings on the deck of the boat, having at one end a bevel-gear 2, connecting with another bevel-gear 3, operated from the engine, and having at the opposite or outer end a bevel-gear 4, with which the bevel-gear 1 engages when lowered.

When the apparatus is not in use, it is elevated so that the cutter stands above the bottom of the boat, as shown in full lines in Fig. 1. When in use, the cutter is lowered below the bottom of the boat, as shown in dotted lines. In this condition the two gears 1 and 4 are engaged and rapid reciprocations are given to the knives, which effectually cut the grasses at the bottom of the canal.

Having described my invention, what I claim as new, and desire to secure by Letters Patent, is—

The combination with a boat of a frame attached to one end, a windlass in the frame, a cross-bar extending across the frame, cords connecting the cross-bar with the windlass whereby the cross-bar can be raised and lowered, rods attached to the cross-bar extending downward, a cutting apparatus attached to the ends of the rods, a rotating shaft also attached to the cross-bar and movable with it; provided at its lower end with a crank that gives motion to a pitman operating the knife-bar, and a gear on the shaft that engages with a driving-gear when the apparatus is lowered, as herein shown and described.

In witness whereof I have hereunto signed my name in the presence of two subscribing witnesses.

JOSEPH C. FARMER.

Witnesses:
  CHAS. R. OSGOOD,
  C. G. CRANNELL.